(12) United States Patent
Weissinger

(10) Patent No.: US 9,614,680 B2
(45) Date of Patent: Apr. 4, 2017

(54) SYSTEM AND METHOD FOR SIGNATURE CAPTURE

(71) Applicant: The Standard Register Company, Dayton, OH (US)

(72) Inventor: Keyton Weissinger, Grayson, GA (US)

(73) Assignee: Standard Register, Inc., North Mankato, MN (US)

( * ) Notice: Subject to any disclaimer, the term of this patent is extended or adjusted under 35 U.S.C. 154(b) by 0 days.

(21) Appl. No.: 14/492,679

(22) Filed: Sep. 22, 2014

(65) Prior Publication Data

US 2016/0087800 A1    Mar. 24, 2016

(51) Int. Cl.
*H04L 29/06*    (2006.01)
*H04L 9/32*     (2006.01)
*H04W 12/08*    (2009.01)

(52) U.S. Cl.
CPC .......... *H04L 9/3247* (2013.01); *H04W 12/08* (2013.01)

(58) Field of Classification Search
CPC ...... G06F 17/241; G06F 17/242; G06F 17/30; G06F 21/31; G06F 21/32; H04L 9/3247; H04W 12/08
See application file for complete search history.

(56) References Cited

U.S. PATENT DOCUMENTS

| | | | | |
|---|---|---|---|---|
| 5,422,953 A | * | 6/1995 | Fischer | G06F 21/725 380/30 |
| 5,872,848 A | * | 2/1999 | Romney | G06F 21/645 705/76 |
| 7,590,852 B2 | * | 9/2009 | Hatter et al. | 713/176 |
| 8,032,397 B2 | | 10/2011 | Lawless | |
| 8,065,163 B2 | | 11/2011 | Morita et al. | |
| 8,151,322 B2 | | 4/2012 | Chen et al. | |
| 8,170,886 B2 | | 5/2012 | Luff | |
| 8,200,700 B2 | | 6/2012 | Moore et al. | |
| 8,341,193 B2 | | 12/2012 | Jones et al. | |
| 8,347,088 B2 | | 1/2013 | Moore et al. | |
| 8,380,541 B1 | | 2/2013 | Holmes | |
| 8,400,974 B2 | | 3/2013 | Mueck et al. | |
| 8,464,335 B1 | | 6/2013 | Sinha et al. | |
| 8,508,757 B2 | | 8/2013 | Koehl | |
| 8,515,777 B1 | | 8/2013 | Rajasenan | |
| 8,521,563 B2 | | 8/2013 | Severin | |
| 8,525,670 B1 | | 9/2013 | Khaira | |
| 8,537,863 B2 | | 9/2013 | Mueck et al. | |
| 8,545,440 B2 | | 10/2013 | Patrick et al. | |
| 8,554,600 B2 | | 10/2013 | Reisman | |
| 8,560,128 B2 | | 10/2013 | Ruff et al. | |
| 8,571,937 B2 | | 10/2013 | Rose et al. | |
| 8,577,803 B2 | | 11/2013 | Chatterjee et al. | |
| 8,606,595 B2 | | 12/2013 | Udani | |
| 8,606,792 B1 | | 12/2013 | Jackson et al. | |
| 8,626,120 B2 | | 1/2014 | Amora et al. | |
| 8,634,981 B1 | | 1/2014 | Hyde et al. | |
| 8,637,233 B2 | | 1/2014 | Nickel et al. | |

(Continued)

*Primary Examiner* — Don Zhao
(74) *Attorney, Agent, or Firm* — Patterson Thuente Pedersen, P.A.

(57) ABSTRACT

A method of signature capture for a document uses a portable digital media device with a touch responsive screen on which the signer traces his signature. An URL address is sent to the device and opened in the web browser. The URL address is valid for a limited period of time, and the signature is stored at a webpage associated with the URL address.

26 Claims, 2 Drawing Sheets

(56) References Cited

U.S. PATENT DOCUMENTS

| | | | |
|---|---|---|---|
| 8,655,307 B1 | 2/2014 | Walker et al. | |
| 8,655,796 B2 | 2/2014 | Udani | |
| 8,660,856 B2 | 2/2014 | Lassetter et al. | |
| 8,667,290 B2 | 3/2014 | Appelbaum et al. | |
| 8,668,141 B2 | 3/2014 | Smith et al. | |
| 8,671,143 B2 | 3/2014 | Lewis | |
| 8,681,951 B1 | 3/2014 | Lavian et al. | |
| 9,176,942 B1* | 11/2015 | McLaughlin | G06F 17/24 |
| 2003/0078880 A1* | 4/2003 | Alley | G06F 21/645 |
| | | | 705/38 |
| 2005/0180618 A1* | 8/2005 | Black | G06F 3/03545 |
| | | | 382/124 |
| 2008/0072334 A1* | 3/2008 | Bailey et al. | 726/28 |
| 2012/0284602 A1* | 11/2012 | Seed et al. | 715/224 |
| 2013/0159720 A1* | 6/2013 | Gonser et al. | 713/176 |
| 2013/0254111 A1* | 9/2013 | Gonser et al. | 705/44 |
| 2013/0332180 A1 | 12/2013 | George et al. | |
| 2014/0281946 A1* | 9/2014 | Avni et al. | 715/268 |
| 2015/0012812 A1* | 1/2015 | Wu et al. | 715/234 |
| 2015/0317643 A1* | 11/2015 | Mian et al. | 715/234 |
| 2015/0348046 A1* | 12/2015 | Battle | G06Q 20/40145 |
| | | | 705/44 |
| 2016/0132873 A1* | 5/2016 | Elbaum | G06Q 20/10 |
| | | | 705/71 |

* cited by examiner

SYSTEM AND METHOD FOR SIGNATURE CAPTURE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This is directed to a method for capturing the image of a handwritten signature, and associating it with an electronic document. Signatures are required for documents of many types, including contracts, and various business forms. As the shift has been made from paper documents to electronic documents, a number of approaches have been taken to capture handwritten signatures electronically. Most signature capture arrangements have used a touch responsive tablet and a stylus, such as those used in retail settings for the completion of credit card forms and transactions. It will be appreciated that such a system is expensive to install and to maintain. It may also be undesirable in some instances to have dedicated tablet and stylus equipment that is used by a great many people. For example, in a hospital admitting office where a series of patients use the equipment, touching the tablet and the stylus, there is a real possibility of surface contamination and the spread of illness.

As a consequence, systems have been devised that permit electronic documents and forms to be signed by an individual who uses his own tablet computer or smartphone. These systems have typically required that the signer install an application onto the tablet computer or smartphone. Additionally, such systems have typically required that the individual establish an account, with the associated difficulties of creating a new user name and password combination to remember. The attendant complications to using systems of this type make them less than desirable for executing documents. This is especially true of situations where only a few documents will be executed.

SUMMARY

A method of capturing the image of a handwritten signature with a portable digital media device for insertion in a document, the portable digital media device being in wireless communication with a first computer, may comprise the steps of using the first computer to access a web application, selecting an electronic document for signature, and entering identification of the portable digital media device. The method further comprises the step of sending a communication wirelessly to the portable digital media device, including a URL address for a webpage. The URL address will function as a working address for only a limited period of time. The URL will contain no information that might identify the signer. The webpage can be accessed with the portable digital media device only during this limited amount of time. The touch responsive screen of the portable digital media device is used to enter the handwritten signature after the identity of the signer is verified.

A method of capturing the image of a handwritten signature for insertion in a document uses a portable digital media device. The portable digital media device is in wireless communication with a first computer. An electronic document for signature is selected with the first computer. The method may comprise the step of receiving a communication with the portable digital media device from the first computer, the communication including a URL address for a webpage. The URL address is a working address for a limited amount of time. The method further includes accessing the webpage with the portable digital media device during the limited amount of time. The method also includes the steps of using the touch responsive screen of the portable digital media device to enter the handwritten signature; and transmitting the handwritten signature from the portable digital media device for association with the document.

DETAILED DESCRIPTION

This relates to a system and a method for capturing the image of a handwritten signature with a portable digital media device. A wide variety of portable digital media devices with touch responsive displays, such as smart phones and tablet computers, have been adapted and used in information systems to perform various functions, in addition to their operation as cell phones and computers. Such portable digital media devices include, for example, iPhone devices from Apple, Inc., Android devices from Motorola, Inc., iPad and iTouch devices from Apple, Inc., tablet computers from a variety of manufacturers, and other similar devices. These devices all include an associated touch responsive display, and a memory in which are stored application programs that control the flow of information and processing of the information by the device and by remote servers. Portable digital media devices also have wireless communication capabilities, such as cell phone, cellular data, Wi-Fi, and other capabilities, which permit communication between the devices, and remote servers and computer systems.

Figure 1:
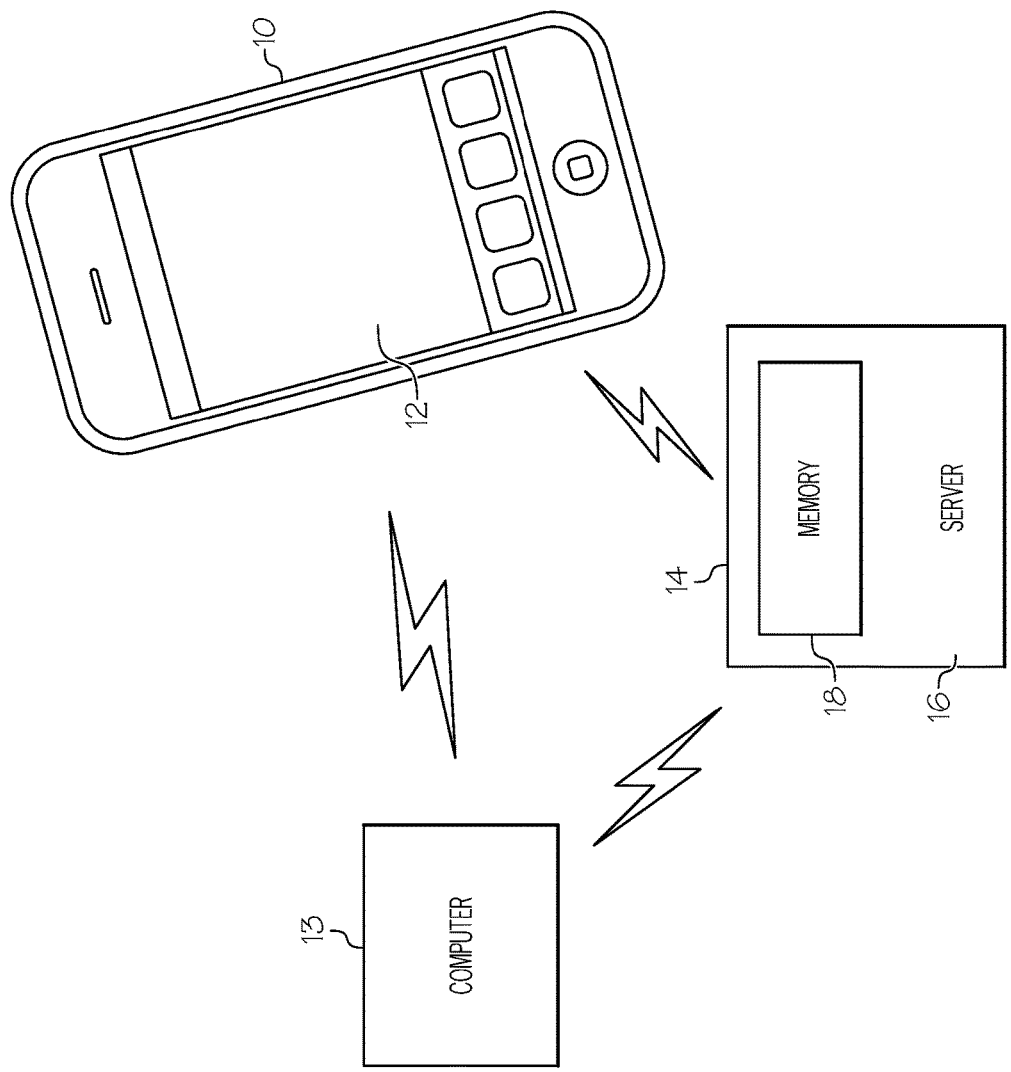
FIG. 1 is a schematic diagram, illustrating an embodiment of the system.

FIG. 1, shows a portable digital media device 10, depicted as an iPhone, with a touch responsive display 12. The device 10 is illustrated diagrammatically as being in wireless communication with a first computer 13, and with second computer 14. The first computer may be a personal computer, a lap top computer, a tablet computer, or the like. Alternatively, it may be an input and display arrangement connected to a remote processing capability of any sort, such as a server or servers, or a cloud computing platform. The second computer 14 may be a remote server 16 having a memory 18. Alternatively, the second computer may be a group of servers operating together or a cloud computing platform. The arrangement allows a handwritten signature to be captured for insertion into, or association with, an electronic document using any internet-capable mobile device, and without the need to install software on the mobile device. The signature is captured by sending to the signer's portable digital media device 10 a time-sensitive URL address in real-time. The signer can then access the web page and, after identity verification, enter a handwritten signature that he has created on the mobile device using his finger or using a stylus. This method can be used anytime an electronic form is being completed via a web application. The web page associated with the time-sensitive URL may be hosted on the second computer 14 or elsewhere, such as on another server or group of servers.

As stated above, the disclosed method allows for the capture of a handwritten signature using the signer's mobile device without the need for software installation on the mobile device. Because a signer uses his own mobile device, not a public device, confusion as to the operation of the device and the spread of infection are both dramatically reduced in a healthcare setting. Finally, because the method may incorporate signer identity verification, location awareness and time-sensitive signatures, there is no need for the signer to create an online identity in order to sign a document.

An example of this method, as applied in a hospital admitting environment, is as follows:

1. A hospital employee in the admitting department, referred to below as a web application user, securely logs into a web application running on server 14. The web application user uses his own computer 13 for this purpose. Computer 13 will typically be located at the user's work station.
2. The web application user then retrieves an electronic patient admission document for completion and signature.
3. After the document is completed by the web application user, using computer 13, the web application user enters the phone number or email address of the patient's mobile device 10 into the web application. It should be appreciated that in other settings, typically non-healthcare settings, the computers 13, 14 and the mobile device 10 may communicate directly, either through wired or wireless means, via an intranet or the like. In such an instance, the intranet address of the device 10 will be entered.
4. The system then sends the patient's mobile device 10 either an SMS text message or an email from the computer 13 or the server 14. This message or email includes an obfuscated URL (containing no patient-specific information) that is only functional for a few minutes, perhaps as little as one to two minutes. In other settings, the computers 13, 14 and the mobile device 10 may communicate directly via an internet or the like.
5. The patient then opens the obfuscated URL in the mobile device's browser. Once the obfuscated URL has been opened, it can not be opened a second time. (If desired, the hospital may allow the URL to be used more than once, however.) If the patient chooses not to sign the document at that time, the patient must be re-prompted later with a different, working URL in another text message or an email. It will be appreciated that the relatively short time window that is provided for the patient to access the URL increases the security of this process.
6. The web application shows the patient a simple page requesting the entry of information to verify the patient's identity, e.g., date of birth, and other information unique to the patient.
7. The patient enters the requested identity information.
8. The web application verifies the entered identify information as accurate.
9. The web application displays the name of the patient for last verification by the patient.
10. The patient approves the verification of his name on the screen.
11. The web application then displays a simple HTML5 canvas or similar screen on the touch responsive screen 12 of the patient's mobile device 10 for the acceptance of a stylus-entered signature or a finger-entered signature. Also displayed at the same time on screen 12 is the name of the document being signed and a link to a PDF or similar rendering of the completed document to be signed. Finally, if the patient is asked to sign multiple documents, he can sign these documents using the same session.
12. The patient "signs" the screen 12 with his finger or with a stylus, and presses a "submit" icon on the screen. This triggers the submission of the signature image to the web application.
13. The patient's mobile device 10 is constantly keeping track of its location through its GPS receiver system. The web application may also retrieve this GPS location information from the mobile device 10, and include this with the signature image file.
14. The web application checks to make sure that the time of submission of the patient's signature does not take place more than a specified amount of time following the creation of the URL used for the submission.
15. The web application then accepts the submitted input and uses it to insert the captured patient signature into the electronic document.

An important feature of this method is sending a time-sensitive URL via text message or email to the signer's mobile device, combined with the use of a simple web page that is viewed on the mobile device and provides the means of signature capture. This eliminates the need for an installed application on the signer's mobile device, and the need for password protection. If desired, further security may be obtained with the capture of the GPS location information at the time of signature. This insures that the signer must be where he is anticipated being in order for the signature to be accepted as valid. In a hospital admissions setting, this might mean that the signature is captured only if it was created at the hospital. Alternatively, if a pre-admission form is being completed and signed, perhaps with telephone contact between a hospital employee and the patient, this might mean that the signature would be accepted only if it were created at an address that matches an address on the completed form, such as for example the patient's home address.

Figure 2:
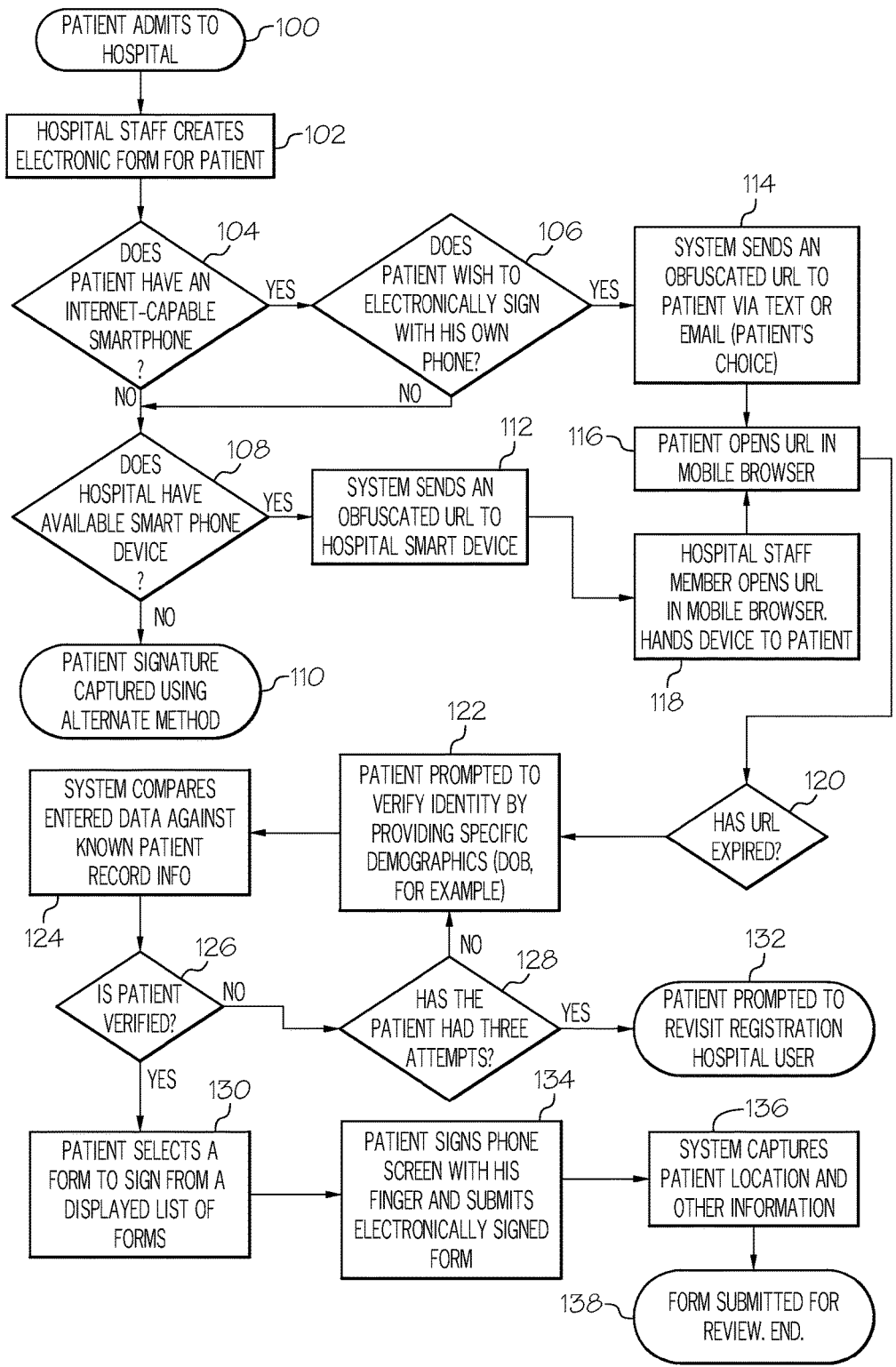
FIG. 2 is a flow chart, useful in understanding an embodiment of the method by which the system operates.

Reference is made to FIG. 2, which is a flow chart illustrating the methods by which signature capture may be accomplished in a hospital admissions setting. The patient enters the admissions department at 100 and meets with a member of the hospital admissions staff. As a part of the admissions process, the staff member using the first computer 13 will access a web application running on the second computer 14. Computers 13 and 14 may be in wireless communication or in direct, wired communication, through an intranet or via the Internet. In any event, the hospital staff person will retrieve an admissions form for completion and signing. After the form is completed by the staff person using computer 13, the staff person enters identification information for the portable digital media device 10. An assessment is made whether the patient has such a device at 104, and if so, whether the patient wishes to sign the form electronically with the device. If the patient does not have a device, or does not want to use his own device, then a hospital owned device may be selected at 108. If the patient does not have a portable digital media device or does not want to use his device, and if the hospital does not have such a device available, then another means of capturing the signature of the patient will be selected at 110.

Assuming that the process will move forward with a portable digital media device, an obfuscated URL address is then sent to either the hospital's device at 112 or the patent's device at 114 as a part of a text message or an e-mail message. The URL address is the address for a webpage hosted by the second computer 14 with the URL address being a working address only for a limited period of time preset by computer 14. The patient opens the URL in the browser of device 10 at 114, or the staff person opens the URL for the patient if the hospital's device is being used, and hands the device to the patient at 118. At 120, the computer 14 checks to see whether this has taken place within the limited period of time that is preset by computer 14. Advantageously, this limited period of time is relatively short so that the likelihood of an unauthorized individual accessing the webpage is extremely low. The duration of this limited period of time may be defined by the computer 14 such that operation of the process is optimized. The patient is then prompted to verify his identity by entering one or more requested items of information that the patient is likely to know, such as for example his date of birth. When the identity of the patient is confirmed at 126, the patient then selects a form to sign from a displayed list at 130, assuming that the hospital staff person has completed more than one such form. The patient then signs the form by tracing his signature with his finger on the touch responsive screen 12 of device 10 at 134 and 136. Alternatively, if preferred, the patient may use a stylus to input his signature on the touch responsive screen. The handwritten signature is then transmitted from the portable digital media device 10 to the second computer 14 for association with the selected document at 138.

It will be appreciated that using this signature capture method may not always be desired or appropriate. For instance, if neither the patient nor the hospital has a smartphone or other portable digital media device available, resort will be made to an alternative method at 110. Similarly, if the patient cannot be verified after three attempts at 126 and 128, the patient will be prompted to contact an admissions staff person directly.

Compared to other known methods presently in use, this approach increases security without introducing inconvenience. This method also reduces the spread of infection in healthcare settings. Further, this method simplifies the execution process, and reduces the cost for the business obtaining the signature. This approach allows for the capture of handwritten signatures without the additional costs associated with dedicated signature capture devices, without the complexity that would be introduced if the signer were to use someone else's mobile device, and without the concern for infection control that is innate to most signature capture pad scenarios. Additionally, using a portable digital media device that has a built-in GPS receiver adds to the security of the signature capture process. Also, this approach eliminates the requirement for usernames and passwords usually needed to log into a web page. This approach operates in real time, and its security features remove the need for the creation of an online account for the signer. This allows the application running on the computer 14 to be an integrated component of a third-party computer application such as a patient portal which may already require an online account to be created. Finally, the security provided by this system reduces the likelihood of fraud, and makes an attempt at repudiation of the signature less likely, as well.

It will be appreciated that this method has benefits that are desirable across a wide range of venues, beyond hospital admissions departments and other health care settings. This method provides for the use of a device that the signer is most familiar, his own smart phone, in capturing a signature.

Further, in any setting, limiting the number of individuals that touch a surface is helpful. Further, in any setting limiting the number of electronic signature devices reduces hardware costs for signature capture systems. Additionally, in any setting the web application's time-sensitive texted or emailed URL increases security. The URL will only work for a few minutes, decreasing the chance of someone else signing the document inappropriately. Finally, the capture of GPS location information from the signer's mobile device provides further security and information regarding the signer's whereabouts at the time of signature. All of this prevents the signer from having to install any software on his mobile device, dramatically reducing the inconvenience, since the signer is not forced to go through a web account creation process.

What is claimed is:

1. A method of capturing an image of a handwritten signature with a portable digital media device for insertion in a document, said portable digital media device being in communication with a first computer, the method comprising:
   using the first computer, accessing a web application;
   using the first computer, selecting an electronic document for signature in the web application;
   using the first computer, entering identification of the portable digital media device in the web application;
   sending a communication to the portable digital media device, including a time-sensitive URL address for a webpage, said URL address being a working address for a preset period of time;
   using the first computer to allow access, via the URL address, to the webpage on the portable digital media device only during said preset period of time to enter said handwritten signature such that said handwritten signature is associated with said document by said web application; and
   using the first computer to disable the URL address after expiration of the preset period of time such that the webpage on the portable digital media device is no longer accessible.

2. The method of capturing the image of a handwritten signature with a portable digital media device for insertion in a document, according to claim 1, in which sending the communication to the portable digital media device, including a URL address for a webpage, includes sending the communication to the portable digital media device wirelessly via email.

3. The method of capturing the image of a handwritten signature with a portable digital media device for insertion in a document, according to claim 1, in which sending the communication to the portable digital media device, including a URL address for a webpage, includes sending the communication to the portable digital media device wirelessly via SMS text message.

4. The method of capturing the image of a handwritten signature with a portable digital media device for insertion in a document, according to claim 1, in which sending the communication to the portable digital media device, including a URL address for a webpage, includes sending the communication to the portable digital media device wirelessly via an intranet.

5. The method of capturing the image of a handwritten signature with a portable digital media device for insertion in a document, according to claim 1, wherein the time-sensitive URL address an obfuscated URL address containing no signatory-specific information.

6. The method of capturing the image of a handwritten signature with a portable digital media device for insertion in a document, according to claim 1, in which communication includes communication over a Wi-Fi link.

7. The method of capturing the image of a handwritten signature with a portable digital media device for insertion in a document, according to claim 1, in which communication includes communication over a cellular link.

8. The method of capturing the image of a handwritten signature with a portable digital media device for insertion in a document, according to claim 1, in which the step of entering identification of the portable digital media device comprises entering the telephone number of the portable digital media device.

9. The method of capturing the image of a handwritten signature with a portable digital media device for insertion in a document, according to claim 1, in which the step of entering identification of the portable digital media device comprises entering an e-mail address linked to the portable digital media device.

10. The method of capturing the image of a handwritten signature with a portable digital media device for insertion in a document, according to claim 1, in which sending the communication to the portable digital media device, including a URL address for a webpage, includes sending the communication to the portable digital media device wirelessly.

11. The method of capturing the image of a handwritten signature with a portable digital media device for insertion in a document, according to claim 1, wherein the portable digital media device includes a GPS receiver system configured to retrieve a location of the portable digital media device, and wherein the handwritten signature is acceptable as valid only if, at the time of signature, the portable digital media device is located at a predetermined acceptable location.

12. A method of capturing an image of a handwritten signature with a portable digital media device for insertion in a document, said portable digital media device being in communication with a first computer, an electronic document for signature having been selected with said first computer, the method comprising:
   receiving a communication, with said portable digital media device, sent by the first computer, said communication including a time-sensitive URL address for a webpage containing a rendering of the electronic document, said URL address being a working address for only a preset period of time after the communication has been sent;
   accessing the webpage with the portable digital media device via the URL address only during said preset period of time, wherein the URL address is disabled after the preset period of time;
   using said touch responsive screen of said portable digital media device to enter said handwritten signature; and
   transmitting said handwritten signature from said portable digital media device for association with said electronic document.

13. The method of capturing the image of a handwritten signature with a portable digital media device for insertion in a document, according to claim 12, in which receiving the communication with said portable digital media device, said communication including a URL address for a webpage, includes receiving wirelessly via e-mail the communication with said portable digital media device.

14. The method of capturing the image of a handwritten signature with a portable digital media device for insertion in a document, according to claim 12, in which receiving the communication with said portable digital media device, said communication including a URL address for a webpage, includes receiving wirelessly via SMS text message the communication with said portable digital media device.

15. The method of capturing the image of a handwritten signature with a portable digital media device for insertion in a document, according to claim 12, in which the handwritten signature is entered on the touch responsive screen of the portable digital media device by signing with a stylus in contact with the screen.

16. The method of capturing the image of a handwritten signature with a portable digital media device for insertion in a document, according to claim 12, in which the handwritten signature is entered on the touch responsive screen of the portable digital media device by signing with a finger in contact with the screen.

17. The method of capturing the image of a handwritten signature with a portable digital media device for insertion in a document, according to claim 12, wherein the time-sensitive URL address is an obfuscated URL address containing no signatory-specific information.

18. The method of capturing the image of a handwritten signature with a portable digital media device for insertion in a document, according to claim 12, in which communication includes wireless communication over the Internet.

19. The method of capturing the image of a handwritten signature with a portable digital media device for insertion in a document, according to claim 12, in which communication includes communication over a Wi-Fi link.

20. The method of capturing the image of a handwritten signature with a portable digital media device for insertion in a document, according to claim 12, in which communication includes communication over a cellular link.

21. The method of capturing the image of a handwritten signature with a portable digital media device for insertion in a document, according to claim 12, wherein the portable digital media device includes a GPS receiver system configured to retrieve a location of the portable digital media device, and the method further comprises:
   retrieving a location of the portable digital media device using the GPS receiver system, wherein the handwritten signature is acceptable as valid only if, at the time of signature, the portable digital media device is located at a predetermined acceptable location.

22. A method of capturing an image of a handwritten signature with a portable digital media device for insertion in a document, said portable digital media device being in communication with a first computer, the method comprising:
   using the first computer, accessing a web application containing the document for signature;
   using the first computer, entering identification of the portable digital media device in the web application;
   sending a communication to the portable digital media device, the communication including a time-sensitive URL address for a webpage, said URL address being a working address for a preset period of time after the communication is sent;
   using the first computer to allow access to the webpage via the URL address with the portable digital media device only during said preset period of time to enter, via said touch responsive screen of said portable digital media device, said handwritten signature such that said handwritten signature is associated with said document by said web application; and allowing the URL address to become disabled upon expiration of the preset period of time.

23. The method of capturing the image of a handwritten signature with a portable digital media device for insertion in a document, according to claim 22, wherein the time-sensitive URL address is an obfuscated URL address containing no signatory-specific information.

24. The method of capturing the image of a handwritten signature with a portable digital media device for insertion in a document, according to claim 22, in which entering identification of the portable digital media device comprises entering the telephone number of the portable digital media device.

25. The method of capturing the image of a handwritten signature with a portable digital media device for insertion in a document, according to claim 22, in which entering identification of the portable digital media device comprises entering an e-mail address linked to the portable digital media device.

26. The method of capturing the image of a handwritten signature with a portable digital media device for insertion in a document, according to claim 22, wherein the portable digital media device includes a GPS receiver system configured to retrieve a location of the portable digital media device, and wherein the handwritten signature is acceptable as valid only if, at the time of signature, the portable digital media device is located at a predetermined acceptable location.

* * * * *